United States Patent
Yang et al.

(10) Patent No.: US 10,503,003 B2
(45) Date of Patent: Dec. 10, 2019

(54) POLARIZER AND METHOD FOR PRODUCING THE SAME, DISPLAY PANEL AND DISPLAY APPARATUS

(71) Applicant: BOE TECHNOLOGY GROUP CO., LTD., Beijing (CN)

(72) Inventors: Jiuxia Yang, Beijing (CN); Feng Bai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 197 days.

(21) Appl. No.: 15/513,550

(22) PCT Filed: Sep. 19, 2016

(86) PCT No.: PCT/CN2016/099284
§ 371 (c)(1),
(2) Date: Mar. 22, 2017

(87) PCT Pub. No.: WO2017/118091
PCT Pub. Date: Jul. 13, 2017

(65) Prior Publication Data
US 2018/0231833 A1    Aug. 16, 2018

(30) Foreign Application Priority Data
Jan. 4, 2016  (CN) .......................... 2016 1 0006848

(51) Int. Cl.
*G02F 1/1335*  (2006.01)
*B29D 11/00*  (2006.01)
(Continued)

(52) U.S. Cl.
CPC .. *G02F 1/133528* (2013.01); *B29D 11/00644* (2013.01); *G02B 5/30* (2013.01);
(Continued)

(58) Field of Classification Search
None
See application file for complete search history.

(56) References Cited

U.S. PATENT DOCUMENTS

| | | | |
|---|---|---|---|
| 2010/0007827 A1* | 1/2010 | Nishimura | B82Y 20/00 349/117 |
| 2012/0176676 A1* | 7/2012 | Sakamoto | G02B 5/3058 359/485.05 |

(Continued)

FOREIGN PATENT DOCUMENTS

| | | |
|---|---|---|
| CN | 104316990 A | 1/2015 |
| CN | 104849906 A | 8/2015 |

(Continued)

OTHER PUBLICATIONS

Second Chinese Office Action, for Chinese Patent Application No. 201610006848.4, dated Sep. 28, 2017, 11 pages.
(Continued)

*Primary Examiner* — Derek S. Chapel
(74) *Attorney, Agent, or Firm* — Kinney & Lange, P.A.

(57) ABSTRACT

A polarizer and a method for producing the same, a display panel and a display apparatus are provided. It belongs to the technical field of display. The polarizer includes: an alignment layer; and a plurality of alignment members formed in the groove of the alignment layer, wherein each of the alignment members has a lengthwise direction parallel to the lengthwise direction of the groove. Under a certain external electrical field, the alignment members may exhibit deformation in large size, movement in a certain direction and rotation by themselves, so as to modulate the polarization orientation of the light.

16 Claims, 4 Drawing Sheets

(51) Int. Cl.
*G02B 5/30* (2006.01)
*H04N 5/74* (2006.01)

(52) U.S. Cl.
CPC ............. *G02B 5/3058* (2013.01); *H04N 5/74* (2013.01); *G02F 2001/133548* (2013.01)

(56) References Cited

U.S. PATENT DOCUMENTS

2012/0287507 A1\* 11/2012 Lee ................. G02B 5/3058
359/492.01
2017/0123126 A1\* 5/2017 Yang .................. G02B 1/14

FOREIGN PATENT DOCUMENTS

| CN | 105093568 A | 11/2015 |
|----|-------------|---------|
| CN | 105425329 A | 3/2016 |
| JP | 2012073515 A | 4/2012 |
| JP | 2013003345 A | 1/2013 |
| KR | 20100049766 A | 5/2010 |

OTHER PUBLICATIONS

First Chinese Office Action and English translation dated Mar. 3, 2017 for corresponding Chinese Application No. 201610006848.4.
International Search Report and Written Opinion (including English translation of Box V) dated Dec. 21, 2016 for corresponding PCT Application No. PCT/CN2016/099284.

\* cited by examiner

POLARIZER AND METHOD FOR PRODUCING THE SAME, DISPLAY PANEL AND DISPLAY APPARATUS

CROSS-REFERENCE TO RELATED APPLICATION

This application claims benefit of the Chinese Patent Application No. 201610006848.4, filed with SIPO on Jan. 4, 2016, which is incorporated herein by reference in their entirety.

BACKGROUND OF THE DISCLOSURE

Field of the Disclosure

The present disclosure relates to the technical field of display, and in particular, to a polarizer, a method for producing the polarizer, a display panel including the polarizer and a display apparatus including the display panel.

Description of the Related Art

Liquid crystal display (abbreviated as LCD) typically uses liquid crystal molecules to cooperate with a polarizer to display images. In particular, LCD typically includes an array substrate and a color filter substrate opposed to each other; and a liquid crystal layer charged between the array substrate and the color filter substrate, a polarizer and a backlight source. The liquid crystal layer includes a plurality of liquid crystal molecules. The polarizer has a certain polarization orientation. The light with the same polarization orientation as that of the polarizer can pass through the polarizer. The polarizer in LCD typically includes: an upper polarizer arranged on a backlight side of the array substrate and a lower polarizer arranged on a light emitting side of the color filter substrate.

The inventors have found the prior art at least have the following problems: the conventional polarizer is typically formed by organic materials such as Polyvinyl alcohol and cellulose triacetate, but the polarizer formed by these materials has poor climate resistance and thus cannot be used in a display apparatus with a high energy excitation light source such as a projection display.

SUMMARY

In accordance with an aspect of the present application, it provides a polarizer, including:

an alignment layer in which a groove is provided the groove extending in the same direction as an alignment direction of the alignment layer; and a plurality of alignment members formed in the groove, wherein each of the alignment members has a lengthwise direction parallel to the direction in which the groove extends.

In an embodiment, a cover layer is provided on a face, on which the groove is provided, of the alignment layer, the alignment members in the groove are sandwiched between the alignment layer and the cover layer, and the groove has two ends extending to edges of the polarizer and forming openings at the edges.

In an embodiment, the cover layer is made of a polyester film; and the alignment layer is made of a polyimide or inorganic material.

In an embodiment, a protection layer is provided on the cover layer and/or on a face of the alignment layer opposite to the face on which the groove is provided.

In an embodiment, an insulation layer is provided on the cover layer and/or on a face of the alignment layer on which the groove is not provided.

In an embodiment, the alignment members are liquid metal members that are cured by a curable material and formed in the groove.

In an embodiment, the liquid metal members are made of alloy composed of at least two of cesium, gallium, rubidium, potassium, sodium, indium, lithium, tin, bismuth, zinc, antimony, magnesium or aluminum.

In an embodiment, the liquid metal members are in form of rods and have long axes parallel to the direction in which the groove extends.

In accordance with another aspect, a method for producing a polarizer is provided, the method including the following steps of:

forming a groove in an alignment layer, the groove extending in the same direction as an alignment direction of the alignment layer; and forming a plurality of alignment members in the groove, wherein each of the alignment members has a lengthwise direction parallel to the direction in which the groove extends.

In an embodiment, forming a plurality of alignment members in the groove includes following steps of:

pouring a mixture of a liquid metal with a curable material into the groove at a mass ratio of the liquid metal to the curable material in the mixture greater than or equal to 9:1;

applying an electrical field parallel to the direction in which the groove extends to the liquid metal to stretch the liquid metal along the direction in which the groove extends to form alignment members; and curing the curable material.

In an embodiment, applying an electrical field parallel to the direction in which the groove extends to the liquid metal to stretch the liquid metal along the direction in which the groove extends to form alignment members includes: applying an electrical field parallel to the direction in which the groove extends to the liquid metal to stretch the liquid metal along the direction in which the groove extends to form rod-shaped liquid metal members that have long axes parallel to the direction in which the groove extends.

In an embodiment, the curable material includes ultraviolet curable material or thermal curable material.

In an embodiment, forming a plurality of alignment members in the groove includes following steps: forming the alignment members by liquid metal; placing the alignment members into the groove.

In an embodiment, after forming a groove in an alignment layer and before forming a plurality of alignment members in the groove, the method further includes: forming a cover layer on the groove in the alignment layer, wherein the groove has two ends extending to an edge of the polarizer and forming openings at the edges.

In an embodiment, after forming a plurality of alignment members in the groove, the method further includes: forming a protection layer on the cover layer and/or on a face of the alignment layer opposite to the face on which the groove is provided.

In an embodiment, after forming a plurality of alignment members in the groove, the method further includes: forming an insulation layer on the cover layer and/or on a face of the alignment layer on which the groove is not provided.

In accordance with another aspect of the present application, a display panel is provided, the display panel including a first substrate and a second substrate arranged opposite to each other and at least one polarizer as described above, and each of the polarizer is arranged adjacent to any one of the first substrate and the second substrate.

In accordance with another aspect of the present application, a display apparatus is provided, the display apparatus including a display panel and a backlight source, wherein the display panel is the above display panel and the backlight source is a laser light source.

In accordance with another aspect of the present application, another display panel is provided, the display panel including a cover substrate and a polarizer, wherein the cover substrate is arranged adjacent to the polarizer and the polarizer is the above polarizer.

In accordance with another aspect of the present application, another display apparatus is provided, the display apparatus including a display panel, wherein the display panel is the above display panel.

DETAILED DESCRIPTION OF PREFERRED EMBODIMENTS OF THE DISCLOSURE

Figure 1:
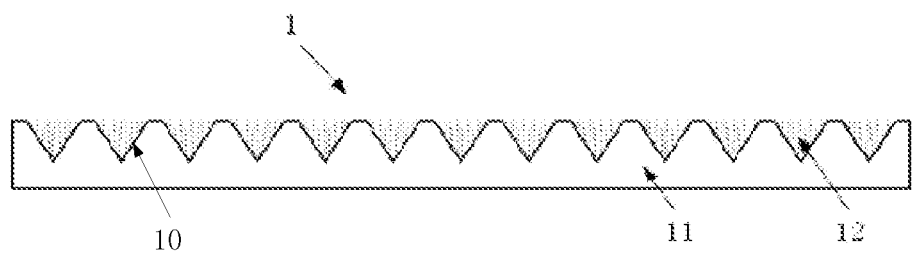
FIG. 1 is a schematic view showing a structure of a polarizer according to an embodiment of the present application.

In order that the present disclosure can be clear to the skilled person in the art, the present application will be further explained below with reference to drawings and embodiments.

In an aspect, an embodiment of the present application provides a polarizer 1. As illustrated in FIGS. 1-4, the polarizer 1 includes: an alignment layer 11 on which a groove 10 is provided and the groove 10 extends in the same direction as an alignment direction of the alignment layer 11; and a plurality of alignment members 12 formed in the groove 10, wherein each of the alignment members 12 has a lengthwise direction parallel to the direction in which the groove 10 extends.

The alignment members 12 may be formed by curing a curable material and may be in forms of such as rods or ellipses. The direction perpendicular to long axes of the alignment members 12 is the polarization orientation of the polarizer 1. For example, the alignment members 12 may have elliptical shapes. In this case, the lengthwise direction of the alignment members 12 is the direction of long axes of the ellipses (i.e., horizontal direction shown in FIG. 3) and the direction of short axes of the ellipses (i.e., vertical direction shown in FIG. 3) is the polarization orientation of the polarizer 1.

Under a certain external electrical field, the alignment members 12 may exhibit deformation in large size, movement in a certain direction and rotation by themselves, so as to modulate the polarization orientation of the light. In addition, the alignment members 12 may include materials with high climate resistance (for example, liquid metal), to provide the climate resistance of the polarizer 1.

As materials for forming the alignment members 12, the liquid metal may be used in the present application. The liquid metal is an amorphous metal, which may be seen as a mixture composed of positive ion flow and freedom electrons. The liquid metal has universal transformation capacity of conversion between different forms and movement modes at room temperature (20° C.~25° C.). For example, the liquid metal members made of the liquid metal immersed in water may exhibit deformation in large size, movement in a certain direction and rotation by themselves under a certain voltage, and the liquid metal members may be for example merged, cracked or remerged. Thus, such property of the liquid metal may be used to form liquid metal pattern. In particular, a piece of large liquid metal film may be contracted as single liquid metal ball within several seconds. Its deformation may be done very rapidly. Furthermore, under the effect of electrical field, a great deal of liquid metal balls separated from each other may be adhered to each other and combined with each other to form single liquid metal ball finally. Under a predetermined electrical field, the liquid metal members may spin at high speed very easily and induce surrounding liquid metal members to spin to form a swirl pair in rapid spin state. If the electrical field is adjusted suitably, the liquid metal members may also move rapidly in a predetermined direction.

As an example, the liquid metal members 12 may be made of alloy composed of at least two of cesium, gallium, rubidium, potassium, sodium, indium, lithium, tin, bismuth, zinc, antimony, magnesium or aluminum.

The groove 10 shown in FIG. 1 is only illustrative, but is not intended to limit the groove 10 in a practical application in the present application. In practice, the groove 10 may have micro-structures and width of the groove 10 may be of nanometer order of magnitude.

Figure 2:
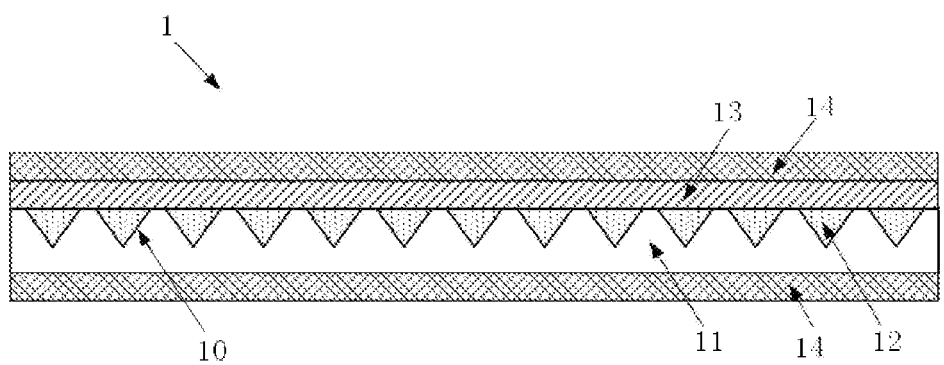
FIG. 2 is a schematic view showing a structure of another polarizer according to an embodiment of the present application.
Figure 3:
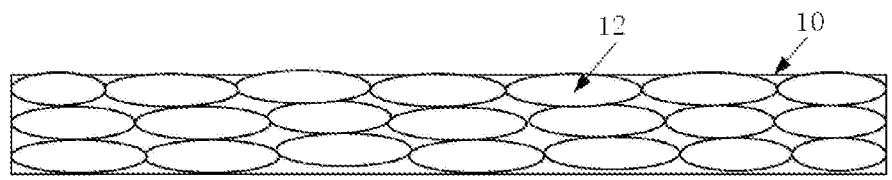
FIG. 3 is a schematic view showing a part of the polarizer shown in FIG. 2.

As an example, a cover layer 13 may be provided on a face with the groove 10 of the alignment layer 11, the alignment members 12 in the groove 10 is sandwiched between the alignment layer 11 and the cover layer 13, and the groove 10 has two ends extending to edges of the polarizer 1, thereby forming openings at the edges. That is, as shown in FIG. 2, the alignment members 12 are sandwiched between the alignment layer 11 and the cover layer 13. Grooves 10 may be arranged in parallel rows. As required, it may be adjusted depending on requirement for an angular provision of the polarizer 1.

As an example, the cover layer 13 may be made of polyester film (abbreviated as PET). In this circumstance, the cover layer 13 may be bonded onto a face with the groove 10 of the alignment layer 11 by a bonding technology. It should be noted that the embodiment is explained by an example in which the cover layer 13 is formed by a PET film, but the cover layer 13 may also be formed by other materials in practice, that is, the material of the cover layer 13 is not limited to the PET film layer.

As an example, the alignment layer 11 may be made of polyimide (abbreviated as PI) or inorganic material. When the alignment layer 11 is formed by the polyimide material, the process for producing it may include: depositing a layer of PI material with a certain thickness onto a carrying substrate by a method such as coating, magnetron sputtering, thermal evaporation or plasma enhanced chemical vapor deposition (abbreviated as PECVD), and curing the PI material to form the alignment layer 11 and then achieving alignment of the alignment layer 11 by means of a rubbing alignment process or a photo alignment process, to form the groove 10 on the alignment layer 11. When the alignment layer 11 is made from inorganic material, the process for producing it may include: depositing a layer of inorganic material with a certain thickness onto a carrying substrate by a method such as coating, magnetron sputtering, thermal evaporation or PECVD, and curing the inorganic material to form the alignment layer 11 and then achieving alignment of the alignment layer 11 by means of a micromaching process, to form the groove 10 on the alignment layer 11. The micromaching process may for example be process such as nanometer imprinting process, process for microelectromechanical systems (abbreviated as MEMS). It should be noted that the embodiment is explained by an example in which the alignment layer 11 is formed by a PI material or an inorganic material, but the alignment layer 11 may also be formed by other materials in practice.

As an example, a protection layer 14 may be provided on the cover layer 13 and/or on a face of the alignment layer 11 opposite to the face with the groove 10. The protection layer 14 may be formed by silicides. A silicide layer with a certain thickness may be deposited as a protection layer 14 on the cover layer 13 and/or on a face of the alignment layer 11 opposite to the face with the groove 10 by the method such as coating, magnetron sputtering, thermal evaporation or PECVD. The protection layer 14 may be generated by chemical reaction of oxides, nitrides or oxynitrides. The corresponding reaction gas may be a gas mixture of $SiH_4$, $NH_3$ and $N_2$ or a gas mixture of $SiH_2Cl_2$, $NH_3$ and $N_2$. It should be noted that the embodiment is explained by an example in which the protection layer 14 is formed by silicides, but the protection layer 14 may also be formed by other materials in practice.

Figure 4:
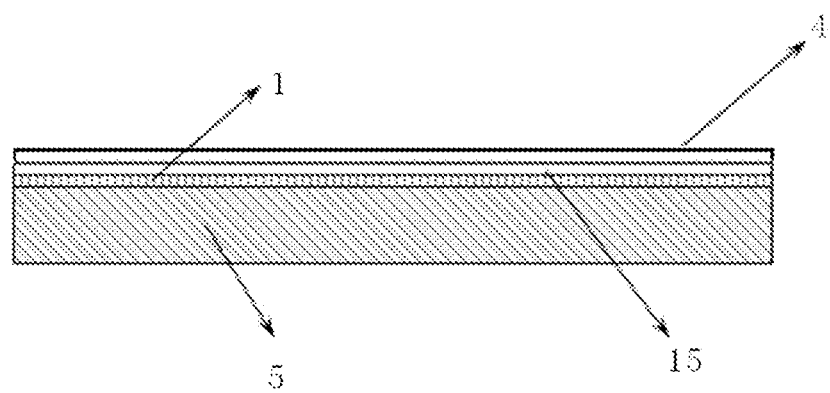
FIG. 4 is a schematic view showing a use state of the polarizer shown in FIG. 2.
Figure 5:
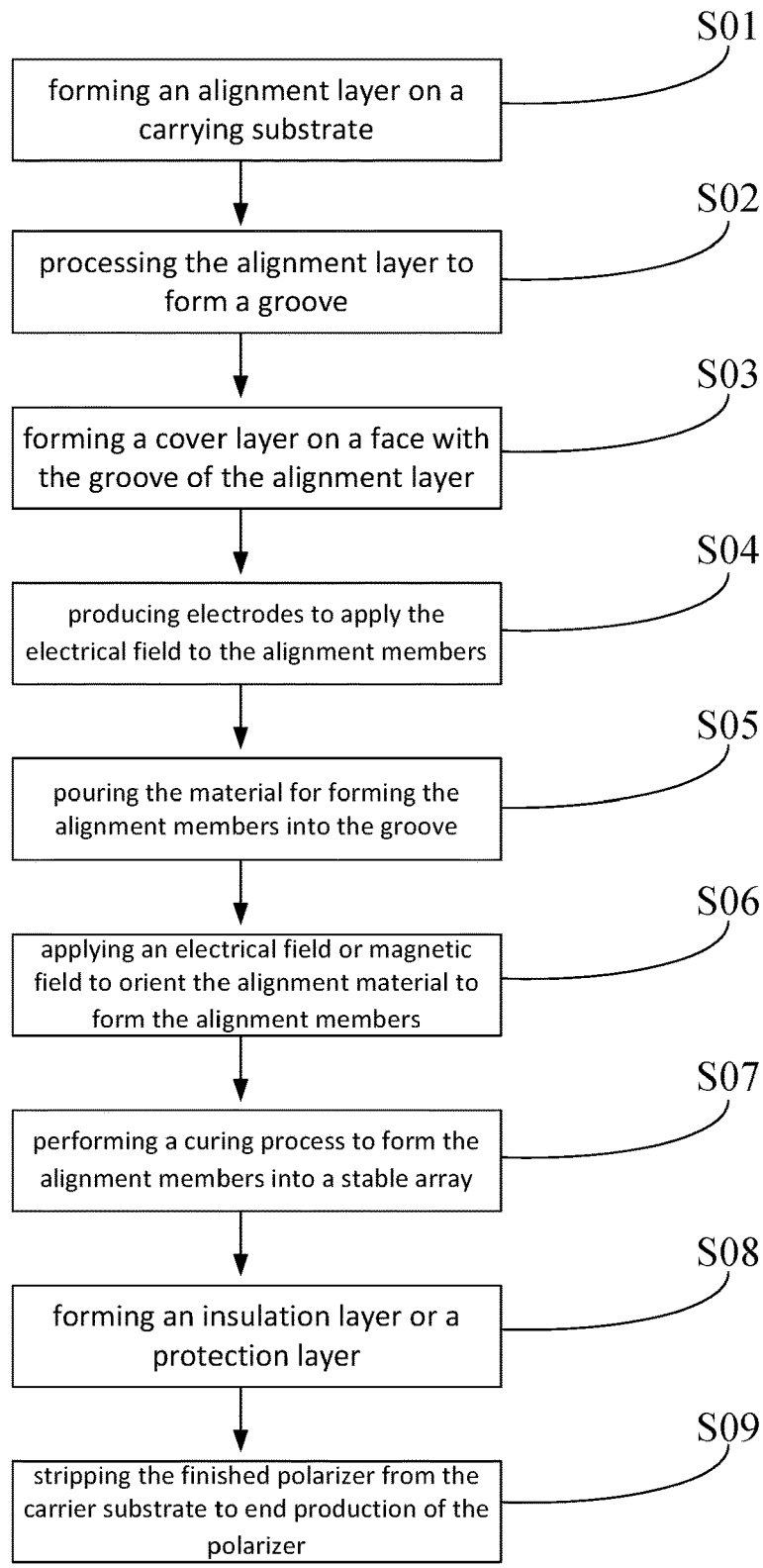
FIG. 5 shows a flow chart of a method for producing a polarizer according to an embodiment of the present application.

As an example, an insulation layer 15 may be provided on the cover layer 13 and/or on a face of the alignment layer 11 on which the groove 10 is not arranged. That is, an insulation layer 15 may also be arranged selectively on the polarizer 1 in the embodiment. As shown in FIG. 4, when the upper polarizer 1 arranged on the backlight side of the array substrate and the lower polarizer 1 arranged on the light emitting side of the color filter substrate each is the polarizer 1 in the embodiment, at least one of the upper polarizer 1 and the lower polarizer 1 may be provided with the insulation layer 15 thereon to insulate the alignment members 12 in the upper polarizer 1 and those in the lower polarizer 1 from each other.

As discussed above, the polarizer 1 provided by the embodiment achieves the polarization function of the polarizer 1 by the alignment members 12 such that the polarization orientation of the polarizer 1 may be controlled easily and the polarizer 1 may have a high yield. The polarizer 1 in the present application has high design density of integration, simple process and low cost. The polarizer 1 in the present application is suitable for various display apparatuses. In addition, as the polarizer 1 of the present application may use the material with good climate resistance (for example liquid metal) as the fundamental material, it may be used in the display apparatus with high energy light source such as laser light source.

In the polarizer of the present application, under a certain external electrical field, the alignment members may exhibit deformation in large size, movement in a certain direction and rotation by themselves, so as to modulate the polarization orientation of the light. The polarizer in the present application has high design density of integration, simple process and low cost. The polarizer in the present application is suitable for various display apparatuses. In addition, as the polarizer of the present application may use the material with good climate resistance as the fundamental material, it may be used in the display apparatus with high energy light source such as laser light source.

In another aspect, an embodiment of the present application also provides a method for producing a polarizer 1. As shown in FIGS. 1-5, the method includes Steps S01 to S09.

In the step S01, an alignment layer 11 is formed on a carrying substrate.

For example, polyimide (abbreviated as PI) is coated onto a carrying substrate, and then the polyimide coated on the carrying substrate is cured to form the alignment layer 11. The carrying substrate may be a glass substrate, for example, a TFT glass substrate, a color filter substrate or a cover glass substrate for OLED. The coating may be done by coating the polyimide onto any surface of the above substrate.

In the step S02, the alignment layer 11 is processed for alignment to form a groove 10, the groove 10 extending in the same direction as an alignment direction of the alignment layer 11.

In the embodiment, the alignment process may be done by rubbing alignment process, or photo alignment process. In the embodiment, as an example, the alignment of the polarization orientation of the polarizer 1 is designed on a basis of the photo alignment process, because the photo alignment process has high consistency without defects due to particles.

That is, the alignment process on the alignment layer 11 is intended to form the groove 10, so as to pour the alignment members 12 into the groove 10 and the alignment members 12 have a lengthwise direction which is arranged to be the direction in which the groove 10 extends. The groove 10 may have micro-structures and width of the groove 10 may be nanometer order of magnitude. The grooves 10 indicating the light polarization orientation are arranged in parallel rows. In practice, the grooves 10 may be trimmed depending on requirements for an angular provision of the polarizer 1.

In the step S03, a cover layer 13 is formed on a face with the groove 10 of the alignment layer 11, and the groove 10 has two ends extending to an edge of the polarizer and thus forming openings.

For example, OCA (Optically Clear Adhesive, adhesives for adhering transparent optical elements) material is coated on the PET film layer, and then after the face of the PET film layer coated with the OCA is aligned with the face with the groove 10 of the alignment layer 11, a pressure such as 5 Pa is applied to the PET film layer to adhere it onto the face with the groove 10 of the alignment layer 11, and then the PET film layer is baked for a certain period at a temperature of 90° C., for example, 10 minutes, to cure the PET film layer and fix it onto the face with the groove 10 of the alignment layer 11.

That is, the cover layer 13 for covering the grove 10 is formed on the surface of the groove 10. The cover layer 13 for covering the groove 10 may be formed by using the PET film layer material and by the processes for layer bonding and applying pressure.

In the step S04, electrodes are produced on the carrying substrate after performing the above steps to apply the electrical field to the alignment members 12.

Applying voltage to the alignment members 12 by the electrodes is intended to cause the lengthwise direction of the alignment members 12 are arranged along the direction in which the groove 10 extends by applying electrical field to achieve alignment of the alignment members 12. It should be understood that the electrodes may be transparent, for example, may be made from ITO. Further, the electrodes may be produced after performing the steps S01, S02, S03. Alternatively, the electrodes may be formed at first directly on the carrying substrate, and then the above steps S01, S02, S03 are performed. The electrodes are for example formed at an edge of the carrying substrate. In this way, the electrodes may be reused after the finished polarizer is stripped in the subsequent steps.

In the step S05, the material for forming the alignment members 12 (for example, the mixture of the liquid metal and the curable material in the embodiment) is poured into the groove 10. In the example, a ratio of weight of the liquid metal to weight of the curable material in the mixture is greater than or equal to 9:1.

For example, the opening at one end of the groove is sealed by ODF (One Drop Fill) process and the mixture of the liquid metal and the curable material is injected into the groove 10 from the opening at the other end of the groove. The injection port (i.e., the opening at the other end of the groove) is sealed after the injection of the mixture has been completed. The seal process may include: coating the OCA material onto the PET film layer and then applying a pressure of such as about 5 Pa to cover the groove 10, and subsequently curing the OCA material to finish the sealing process. The uniformity of charging the material may be ensured by CCD (Charge-coupled Device) inspection. Its principle is similar to the principle for injecting liquid crystal into a liquid crystal cell of the display panel in the conventional liquid crystal display. Instead of ODF, the groove may be filled with the mixture of the liquid metal and the curable material by creating vacuum in the groove.

In the step S06, an electrical field or magnetic field may be applied onto the carrying substrate after the above steps, to orient the alignment material (for example, the liquid metal in the embodiment) to form the alignment members 12.

For example, the voltage of 2-10V is applied to the electrodes for 10 to 30 seconds such that the electrodes apply an electrical field with a predetermined intensity to the alignment material for 10 to 30 seconds. In this way, under the electrical field applied by the electrodes, the alignment material each stretches along the extending direction of the groove 10 in which the alignment material is arranged to form the stretched shape (for example, rod or ellipse). Finally, the lengthwise direction (i.e., the stretching direction) of each of the stretched alignment material is parallel to the direction in which the groove 10 extends.

The alignment members 12 have three dimensional structures with length and thickness, thus, by orientation process, its thickness direction becomes the polarization orientation of the polarizer 1 and its lengthwise direction is perpendicular to the polarization orientation. Such design may achieve the polarization of the light, that is, when the light is incident, only the linearly polarized light may be permitted to pass through it while other lights are blocked.

In the step S07, the curable material is cured to form the alignment members 12 into a stable array.

For example, the curable material may be cured by ultraviolet curing process or thermal curing process. The specific curing process depends on the compositions of the curable material. If the curable material includes unsaturated resin (for example urethane acrylic resin) and monomer material (for example ethylenic unsaturated monomer), it will be cured by ultraviolet curing process. If the curable material includes thermal curable resin, it will be cured by thermal curing process.

The liquid metal has very high mobility and may exist in any forms under the electrical field and magnetic field. Such characteristic is beneficial to the polarizer applied to the present application. Thus, it is preferred that the liquid metal is used as alignment material. The stable array in the present application means the lengthwise directions of the respective alignment members 12 are arranged along the same direction and arranged in the designed groove 10. In this way, it may control the light to pass through it or not.

In the step S08 (optional), an insulation layer 15 is formed on the cover layer 13 and/or on a face of the alignment layer 11 on which the groove 10 is not arranged. When the upper polarizer 1 arranged on the backlight side of the array substrate and the lower polarizer 1 arranged on the light emitting side of the color filter substrate each is the polarizer 1 in the embodiment, at least one of the upper polarizer 1 and the lower polarizer 1 may be provided with the insulation layer 15 thereon. The insulation layer 15 is arranged between the alignment members 12 in the upper polarizer 1 and those in the lower polarizer 1 and functions to insulate the alignment members 12 in the upper polarizer 1 and those in the lower polarizer 1 from each other.

Or, a protection layer 14 may be provided on the cover layer 13 and/or on a face of the alignment layer 11 opposite to the face with the groove 10. The protection layer 14 may be formed by silicides. A layer of silicide with a certain thickness may be deposited as a protection layer 14 on the cover layer 13 and/or on a face of the alignment layer 11 opposite to the face with the groove 10 by the method such as coating, magnetron sputtering, thermal evaporation or PECVD. The protection layer 14 may be generated by chemical reaction of oxides, nitrides or oxynitrides. The corresponding reaction gas may be a gas mixture of $SiH_4$, $NH_3$ and $N_2$ or a gas mixture of $SiH_2Cl_2$, $NH_3$ and $N_2$.

The above steps for forming the protection layer 14 or the insulation layer 15 on the face of the alignment layer 11 on which the groove 10 is not arranged may be performed after the polarizer 1 has been stripped from the carrying substrate, or the steps S01, S02 and the like may be performed after the insulation layer 15 or the protection layer 14 is formed on the carrying substrate in advance.

Alternatively, a functional layer may be formed on the surface of the carrying substrate after the above steps are completed. That is, the surface layer of the carrying substrate may be processed using adhering process or coating process. For example, if it is desired that the polarizer 1 has a certain anti-reflection property, a layer of anti-reflection film will be provided on the basis of the above steps; or other surface treatments are applicable to impart it with functions such as anti-reflection, scratch resistance, brightness enhancement.

In the step S09, the finished polarizer 1 is stripped from the carrying substrate to end production of the polarizer 1.

An embodiment of the present application also provides another method for producing the polarizer. It is similar to the method provided by the above embodiments except that forming a plurality of alignment members in the groove includes forming the alignment members at first by the alignment material and then putting the alignment members into the groove.

That is, the alignment material is produced into the alignment members at first before pouring it into the groove, and then the alignment members are poured directly into the groove.

The method specifically includes the following steps:

step S1 of forming an alignment layer on a carrying substrate;

step S2 of performing alignment process on the alignment layer to form a groove, the groove extending in the same direction as an alignment direction of the alignment layer;

step S3 of forming alignment members by using the alignment material and then placing the alignment members into the groove and curing the alignment members;

step S4 of forming a cover layer;

step S5 of forming an insulation layer or a protection layer;

step S6 of stripping the finished polarizer from the carrying substrate to end production of the polarizer.

Figure 6:
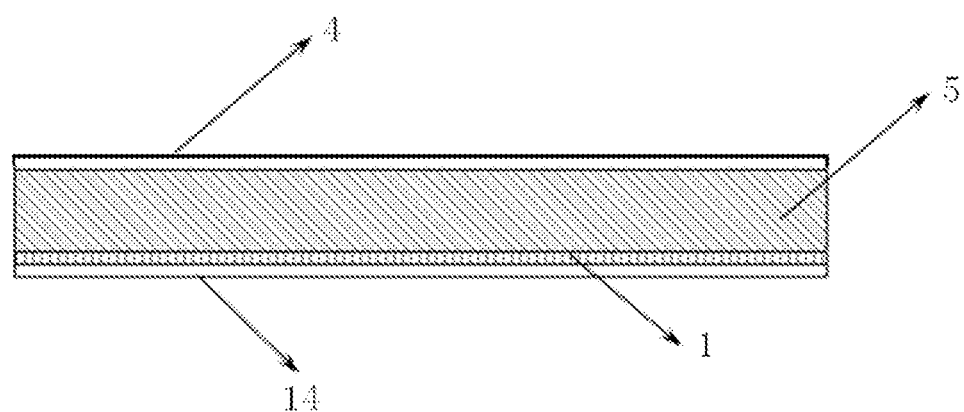
FIG. 6 is a schematic view showing a structure of a display panel according to an embodiment of the present application.

In another aspect, an embodiment of the present application also provides a display panel including a first substrate 4 and a second substrate 5 opposed to each other, as well as at least one polarizer 1 as described in the previous embodiment. As shown in FIG. 6, the polarizer 1 is arranged adjacent to any one of the first substrate 4 or the second substrate 5. In this embodiment, the first substrate 4 may be a color filter substrate and the second substrate 5 may be an array substrate; or the first substrate 4 may be an array substrate and the second substrate 5 may be a color filter substrate.

In a further aspect, an embodiment of the present application also provides a display panel including a cover substrate and a polarizer. The cover substrate is arranged adjacent to the polarizer. The polarizer is the polarizer as described in the above embodiment.

Obviously, the implementations of the above embodiments may also be varied. For example, the alignment layer may be formed in any method selected as required, or corresponding functional layers may be formed on the polarizer, for example, the corresponding surface treatments are applicable to impart it with functions such as anti-reflection, scratch resistance, brightness enhancement.

In another aspect of present application, an embodiment of the present application also provides a display apparatus including any one of the above display panels. The display apparatus may include any products or components having the display function, such as liquid crystal display panels, electronic papers, OLED panels, cell phones, tablet computers, TVs, display devices, notebook computers, digital camera frames or navigators.

As an example, the display apparatus may include a display panel and a backlight source. The backlight source is a laser light source. As the polarizer of the present application uses the material with good climate resistance as a basis material, thus, it may be used in the display apparatus including a high energy light source such as the laser light source.

It should be understood that the above embodiments are only exemplary embodiments for illustrating the principles of the present application, however, the present application is not limited to this. The skilled person in the art may make various modifications and improvements on the present disclosure without departing from the scope and spirit of the present disclosure. These modifications and improvements shall fall within the scope of the present application.

What is claimed is:

1. A polarizer, comprising:
    an alignment layer in which a groove is provided, the groove extending in the same direction as an alignment direction of the alignment layer;
    a plurality of rod-shaped liquid metal members in the groove, wherein each of the plurality of rod-shaped liquid metal members has a long axis parallel to a lengthwise direction of the groove, and
    a curable material arranged in the groove and mixed with the plurality of rod-shaped liquid metal members, the curable material being cured to form the plurality of rod-shaped liquid metal members into a stable array.

2. The polarizer according to claim 1, wherein a cover layer is provided on a face, on which the groove is provided, of the alignment layer, the rod-shaped liquid metal-members in the groove are sandwiched between the alignment layer and the cover layer, and the groove has two ends extending to edges of the polarizer and forming openings at the edges.

3. The polarizer according to claim 2, wherein
    the cover layer is made of a polyester film; and
    the alignment layer is made of a polyimide or inorganic material.

4. The polarizer according to claim 2, wherein a protection layer is provided on the cover layer and/or on a face of the alignment layer opposite to the face on which the groove is provided.

5. The polarizer according to claim 2, wherein an insulation layer is provided on the cover layer and/or on a face of the alignment layer on which the groove is not provided.

6. The polarizer according to claim 1, wherein the rod-shaped liquid metal members are made of an alloy composed of at least two of cesium, gallium, rubidium, potassium, sodium, indium, lithium, tin, bismuth, zinc, antimony, magnesium and aluminum.

7. A display panel comprising the polarizer according to claim 1.

8. A display apparatus, comprising the display panel according to claim 7.

9. The display panel according to claim 7, further comprising a first substrate and a second substrate arranged opposite to each other, wherein the polarizer is provided on at least one of the first substrate and the second substrate.

10. A display apparatus comprising the display panel according to claim 9.

11. A method for producing a polarizer, the method comprising:
    forming a groove in an alignment layer, the groove extending in the same direction as an alignment direction of the alignment layer; and
    forming a plurality of rod-shaped liquid metal members, wherein each of the rod-shaped liquid metal members has a long axis parallel to a lengthwise direction of the groove,
    wherein forming a plurality of rod-shaped liquid metal members comprises:
        pouring a mixture of a liquid metal with a curable material into the groove;
        applying an electrical field parallel to the lengthwise direction of the groove to the liquid metal to stretch the liquid metal along the lengthwise direction of the groove to form the plurality of rod-shaped liquid metal members: and
        curing the curable material.

12. The method according to claim 11, wherein
    a mass ratio of the liquid metal to the curable material in the mixture is greater than or equal to 9:1.

13. The method according to claim 12, wherein the curable material comprises ultraviolet curable material or thermal curable material.

14. The method according to claim 11, wherein after forming the groove in the alignment layer and before forming the plurality of rod-shaped liquid metal members in the groove, the method further comprises: forming a cover layer on a face, on which the groove is provided, of the alignment layer, wherein the groove has two ends extending to edges of the polarizer and forming openings at the edges.

15. The method according to claim 14, wherein after forming the plurality of rod-shaped liquid metal members in the groove, the method further comprises: forming a protection layer on the cover layer and/or on a face of the alignment layer opposite to the face on which the groove is provided.

16. The method according to claim 14, wherein after forming a plurality of rod-shaped liquid metal members in the groove, the method further comprises: forming an insulation layer on the cover layer and/or on a face of the alignment layer on which the groove is not provided.

* * * * *